N. E. SALSICH.
AUTOMATIC SAFETY SPRING LATCH.
APPLICATION FILED MAY 14, 1920.
1,393,246.
Patented Oct. 11, 1921.
3 SHEETS—SHEET 1.
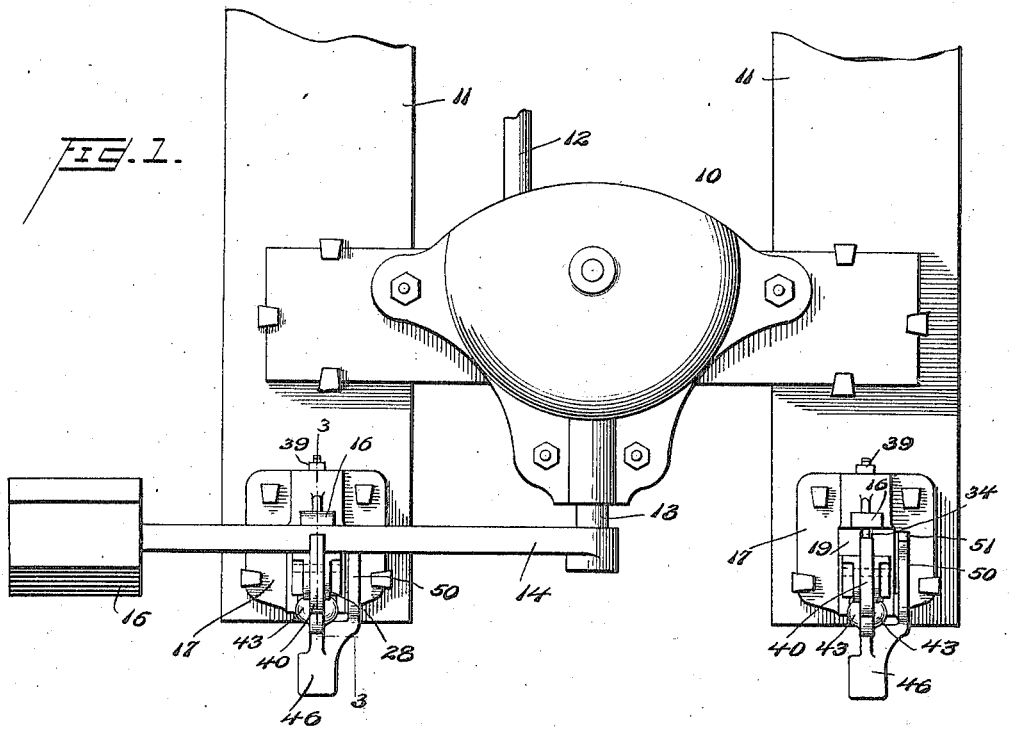
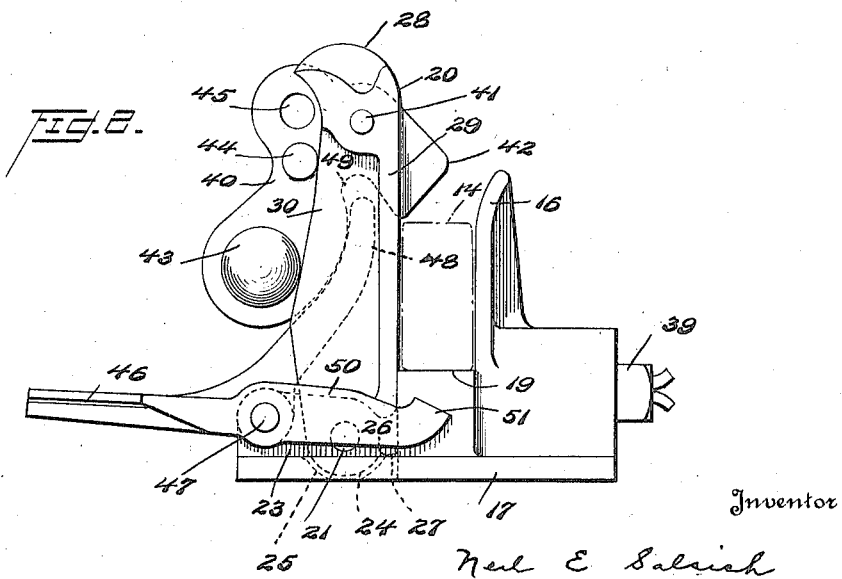
Inventor
Neil E. Salsich
By Watson, Coit, Marrs & Grindle
Attorney N. E. SALSICH.
AUTOMATIC SAFETY SPRING LATCH.
APPLICATION FILED MAY 14, 1920.
1,393,246.
Patented Oct. 11, 1921.
3 SHEETS—SHEET 2.
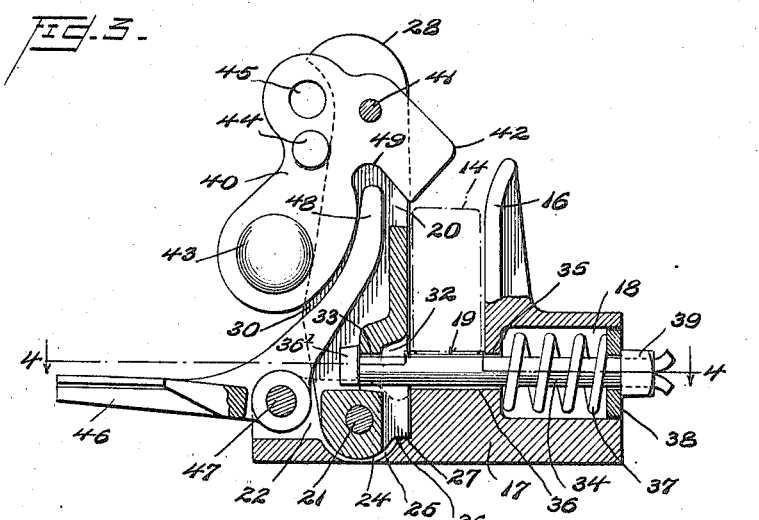
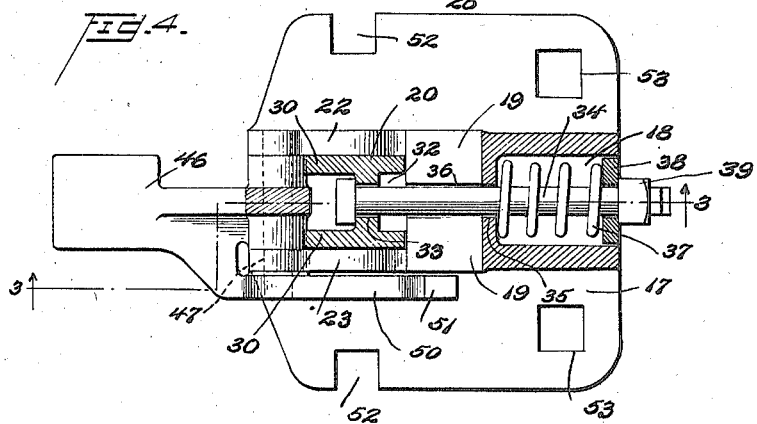
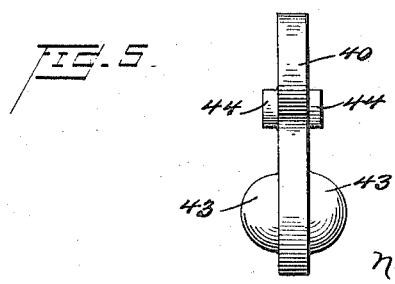
Inventor
Neil E. Salsich
By Watson, Coit, Morse & Grindle
Attorney

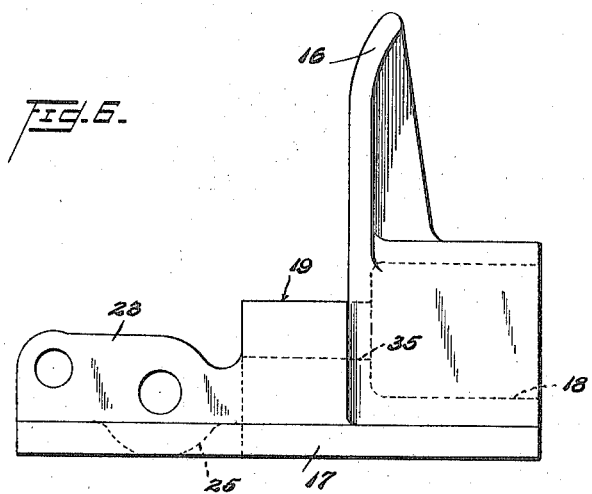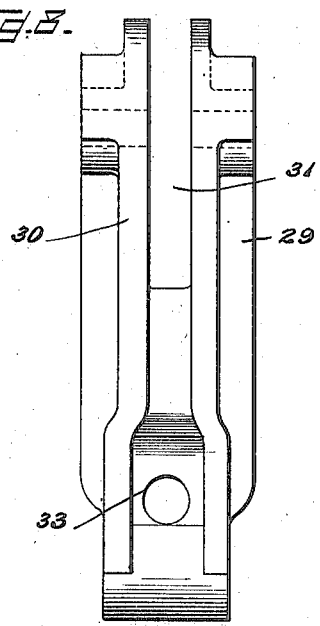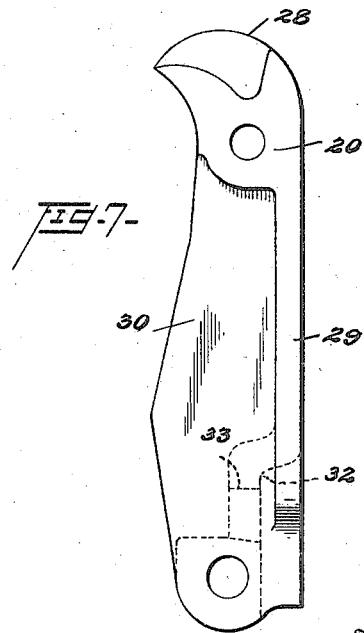

UNITED STATES PATENT OFFICE.

NEIL E. SALSICH, OF BETHLEHEM, PENNSYLVANIA.

AUTOMATIC SAFETY SPRING-LATCH.

1,393,246. Specification of Letters Patent. Patented Oct. 11, 1921.

Application filed May 14, 1920. Serial No. 381,340.

*To all whom it may concern:*

Be it known that I, NEIL E. SALSICH, a citizen of the United States, and residing at Bethlehem, Northampton county, State of Pennsylvania, have invented certain new and useful Improvements in Automatic Safety Spring-Latches, of which the following is a specification.

This invention relates to automatic locking means for the switch stand lever arms used in throwing the switches along railroad tracks from one position to another. It includes improved means for securing those old and known functions and operations which are desirable in switch mechanism in a more satisfactory way than heretofore, and means for securing new functions and advantages. In the embodiment of it to be described, it includes a receiving socket for the switch stand lever arm provided with a retaining latch freely movable by the descending switch stand lever arm out of its path in entering the socket, but which automatically and by the action of gravity returns to locking position over the switch stand lever arm to resist upward movement as soon as the lever arm passes. The latch is furthermore freely movable when not locked by manual means, such as a foot lever out of retaining position with no resistance to overcome, save the weight of its overbalance and the friction of its bearing, and is further provided with means operated by the switch stand lever arm as it reaches the end of its descent for supplementing the gravity action and positively move said latch to locking position above the lever arm. These features make it certain that when the switch stand lever arm is raised in operating the switch stand lever arm from one socket and turned and allowed to fall into the other socket under its own weight and without special attention by the switchman, the arm will without obstruction or possible catching go completely home in the socket and be locked against reverse movement and will, at the same time, permit its release by very little manual effort. The latch furthermore may be positively locked against movement on its support when in position over the lever arm, as by a padlock. One important feature of my invention furthermore is that even while the latch is locked in operative position the lever arm may automatically release itself without breaking or injuring the mechanism when a train trailing through the switch imparts to the switch stand lever arm extraordinary and very great force, tending to lift it against the latch. This insures against accident or breakage when the train by mistake goes through a switch set against that movement. This result which I believe to be broadly new in switch mechanism of this kind is brought about by mounting the retaining latch at one side of the socket on a supporting member which is movable away from the other side of the socket a sufficient distance to carry the latch out of the path of the lever arm, but which movement is resisted with considerable force by yielding means such as a spring, the latch being so shaped and mounted that the upward pressure of the arm on its lower face under the extraordinary force mentioned tends to and does move it and through it, its supporting member out of the path of the arm and the lock which holds the latch against movement on its supporting member is so arranged that it will not prevent or interfere with this necessary movement of that supporting member and latch. There is a foot lever mounted independently of said movable latch supporting member for moving the latch on that member, but there is no manual operable means for moving the supporting member itself. Other novel features will be apparent from the following description and claims taken in connection with the drawings.

In the drawings,

Figure 1 is a plan view of a known switch stand arrangement including my automatic locking mechanism;

Fig. 2 is an end view of my locking mechanism;

Fig. 3 is a vertical section transversely of the lever socket on lines 3—3 of Figs. 1 and 4, but leaving the foot lever in full line except for a part broken away;

Fig. 4 is a horizontal section looking down on the line 4—4 of Fig. 3;

Fig. 5 is a view of the latch detached, viewed from the left in Fig. 3;

Fig. 6 is a detached side view of the main frame of the latch mechanism including the fixed guide member;

Fig. 7 is a side view of the movable latch supporting member detached; and

Fig. 8 is a view of the latch supporting member detached, viewed from the left in Fig. 3.

In Fig. 1 I have shown a well known form of switch stand 10 secured to and carried by the cross ties 11 of the railroad. As is well known it includes mechanism for operating the switch rod 12 to open or close the switch on the railroad through the turning of the shaft 13 when the lever arm 14 secured thereto is moved upwardly in the arc of a circle from horizontal position on one side over to horizontal position on the other side. The lever arm 14 as is usual has a weight 15 on its end, serving to help carry it to its lowest position and to hold it there when operating the switch. The purpose, functions and operations of these features will be understood without further description and it will also be understood that it has been the practice heretofore to provide means more or less automatic to receive and retain the lever arm at the extreme horizontal limits of its movement.

My invention relates to and resides in new and improved latching mechanism to receive and hold down the lever arm, and has the various functions and advantages indicated above, including great ease and certainty of operation and the avoidance of accidental breakage or unauthorized operation. The socket to receive the lever arm 14 is provided with a fixed guide member 16 slightly curved upwardly at the top and preferably formed integral with a base 17 which carries and supports the other parts of the latch mechanism. This base and fixed guide member are shown separately in Fig. 6 and is provided with a cylindrical opening or socket 18 in its lower portion at one end slightly above the bottom to receive spring mechanism to be described. Ledges or an abutment 19 are in advance of the fixed guide 16 to serve as a stop and support for the lever arm 14 when it reaches the bottom of the socket. A movable latch supporting member 20 is pivotally mounted on a rod or shaft 21 which has end bearings in the upwardly extending side flanges 22, 23 on the base 17 beyond the support 19. The lower end of the movable member 20 is rounded at 24 and moves in a rounded depression 25 in the supporting member 17, but out of contact therewith. The member 20 furthermore has a straight projecting portion 26 which rests on the ledge 27 of the base 17 when the member 20 is in vertical position, and at the same time, the vertical portion of the member 20 opposite the projections constituting the bottom member 19 of the socket, rest against those projections additionally serving to hold the member 20 in vertical position against further movement toward the fixed guide member 16. It will be noted that the upper end of the member 20 is rounded at 28, but from that point down to the bottom of the socket the surface is straight, serving as a guide for the lever arm 14. The movable latch supporting member 20 is preferably made as shown with the laterally extending flanges 29 at the edge next to the socket with the vertical flanges 30 at right angles thereto within the margin, leaving a slot 31 through the top of the member 20 at right angles to the path of movement of the lever arm. A depression 32 is formed in the face of member 20 next to the lever space near the bottom and between the projecting ears 26 an opening or passageway 33 is formed in it not far above its pivotal support 21. The rear flanges 30 are preferably made with their free edges on an incline, as shown in Fig. 7. A rod 34 passes centrally through the chamber 18 and through an opening 35 at the inner end thereof along a groove 36 in the upper surface of the support 19 and then through the opening 33 in the member 20, and is there provided with a head or cross extension 36' to prevent withdrawal to the right in Fig. 3. It will be noted that the opening 33 is somewhat larger than the rod 34 so as to permit some relative turning movement. A coiled spring 37 is placed in the socket 18 bearing against the inner end around the opening 35 and at the outer end against a washer 38 and the washer in turn bears against a nut or fastening means 39 which may be secured permanently on the rod 34 by upsetting it. It will be observed that the spring 37 acting on the washer and the rod 34 tends to hold the movable member 20 in vertical position in the limit of its movement toward the fixed guide 16, but permits member 20 to turn on the pivot 21 away from the fixed guide member and the tension of this spring is preferably made such as to prevent manual turning of the member 20 without special lever mechanism.

Mounted in the slot 31 in the upper portion of the movable supporting member 20, is a latch 40 supported on a pivot pin 41 and this latch is preferably of the shape shown in Fig. 3 where the nose or point 42 projecting out above the lever arm 14 is somewhat inclined both above and below so that contact of the lever with it in entering or leaving will have a wedging action. As will be seen by reference to Fig. 5, the latch 40 has rounded enlargements 43 near its depending lower end tending to turn the latch on its pivot 41 so as to project into the path of the lever arm and is also provided with side projections 44 adapted to bear against the vertical flanges 30 to limit movement of the latch counter clockwise, and thus preventing the turning of the latch on its support by upward pressure of the lever arm against it when in locked position. The latch 40 in its upward rear portion is provided with a hole 45 to receive a padlock or other form of lock which will in coöperation with the lugs 44, prevent movement of the latch in either direction on the supporting member 20 around the pivot 41. It will be understood that the lock will come against the rear face of the member 20 at the sides of the slot 31 if the effort is made to turn the lock clockwise and the lugs 44, as above stated, prevent counter clockwise movement.

In order to furnish easy means for manually operating the latch 40, I make use of a foot lever 46 mounted on a pivot shaft or rod 47 having bearings in the vertical flanges 23 on the member 17. It will be noted that this lever is mounted independently of the latch supporting member 20, and that it has a curved portion or toe 48 extending upwardly between the projections 30 and entering the socket 49 in the lower inner edge of the latch 40 so as to serve as a means for positively turning that latch on its pivot 41 in either direction. It will be noted that no force or effort is necessary in moving the latch into or out of operative position except to overcome the gravity or weight of the latch, which tends to hold it in locked position and this is quite insignificant. The foot lever 46 has at one side a finger or part 50 extending horizontally outside of the vertical flange 23 of the member 17 to a point beneath the lever arm socket, and is provided with upturned end 51 which is adapted to occupy a position slightly above the supporting ledge 19 for the lever when the foot lever is turned to the position which it will occupy when the latch 40 has been moved clockwise by the descent of the lever arm out of its path. It will be understood that any material movement of the latch will through the socket 49 acting on the toe 48 move the foot lever on its pivot 47 just as any material movement of the foot lever moves the latch. In this way when the lever arm 14 in passing down into the socket moves the latch 40 clockwise out of its path, the end 51 connected to the foot lever will be struck by the descending arm and this will cause the rotation of the foot lever on its pivot and through the toe 48 will positively move the latch into position above the lever arm, thus securing positive latching as well as the automatic gravity latching and avoids the possibility of the lever arm rebounding before it is caught.

It is believed that it will be fully understood from the structure as above stated that the switchman in operating the switch is required merely to press his foot lightly on the foot lever swinging the latch out of the path of the lever arm 14 permitting him to throw that lever arm over to the other side where it will automatically enter the locking socket on that side and be held in place. On the other hand, any upward movement of the lever arm 14 bearing against the point 42 of the latch, while it can not turn the latch on its supporting member 20 whether that latch is locked or unlocked, tends to move the latch and its supporting member 20 to the left in Fig. 3 and out of the path of the lever arm and where the upward force is of very great and extraordinary character as where a train passes through the switch, the force will be sufficient to move the latch carrying member 20 and its latch out of the way permitting the lever arm 14 to swing over to the other latch mechanism without breaking or damaging the mechanism.

It will be understood that the main supporting member 17 may be secured to the cross tie 11 in any suitable way, slots 52 and openings 53 being shown to receive suitable fastening devices. Those skilled in the art furthermore will understand the best material to be used in making the various parts of the mechanism.

It is to be particularly noted that in this structure, manual operation of the latch carrying member against the high tension of the spring 37 is not only unnecessary in the ordinary operation of the device, but is impossible because of the absence of any lever mechanism for effecting this turning movement.

Having thus described the invention what is claimed as new and desired to be secured by Letters Patent is:

1. In a locking mechanism for switch levers, the combination with a guide member, of a latch carrying member movable toward and away from said guide member within fixed limits so formed and mounted as to be free from any special means for manually moving it, spring mechanism tending to hold said movable member in proper relation to said guide member to receive the switch arm, an automatic movable latch on said latch carrying member so formed and mounted as to be freely movable by the switch arm in descending, but resisting upward movement of said arm and transmitting the force thereof to its supporting member to move it and the latch away from the guide member and out of the path of the lever.

2. In a locking mechanism for switch levers the combination with a guide member, of a latch carrying member movable toward and away from said guide member within fixed limits so formed and mounted as to be free from any special means for manually moving it, spring mechanism tending to hold said movable member in proper relation to said guide member to receive the switch arm of sufficient strength to prevent manual movement thereof, an automatic movable latch on said latch carrying member so formed and mounted as to be freely movable by the switch arm in descending but resisting upward movement of said arm and transmitting the force thereof to its supporting member to move it and the latch away from the guide member and out of the path of the lever arm.

3. In a locking mechanism for switch levers the combination with a guide member, of a latch carrying member movable toward and away from said guide member within fixed limits so formed and mounted as to be free from any special means for manually moving it, spring mechanism tending to hold said movable member in proper relation to said guide member to receive the switch arm, an automatic movable latch on said latch carrying member so formed and mounted as to be freely movable by the switch arm in descending but resisting upward movement of said arm and transmitting the force thereof to its supporting member to move it and the latch away from the guide member and out of the path of the lever, and manually operable means for moving said latch on said supporting member out of operative position.

4. In a locking mechanism for switch levers, the combination with a guide member, of a latch carrying member movable toward and away from said guide member within fixed limits so formed and mounted as to be free from any special means for manually moving it, spring mechanism tending to hold said movable member in proper relation to said guide member to receive the switch arm, an automatic movable latch on said latch carrying member so formed and mounted as to be freely movable by the switch arm in descending, but resisting upward movement of said arm and transmitting the force thereof to its supporting member to move it and the latch away from the guide member and out of the path of the lever, a foot lever independent of said movable member for moving said latch on said movable member in either direction.

5. In a locking mechanism for switch levers, the combination with a guide member, of a latch carrying member movable toward and away from said guide member within fixed limits so formed and mounted as to be free from any special means for manually moving it, spring mechanism tending to hold said movable member in proper relation to said guide member to receive the switch arm, an automatic movable latch on said latch carrying member so formed and mounted as to be freely movable by the switch arm in descending, but resisting upward movement of said arm and transmitting the force thereof to its supporting member to move it and the latch away from the guide member and out of the path of the lever, a foot lever independent of said movable member for moving said latch on said movable member in either direction, and an extension on said foot lever in the path of and adapted to be struck by the descending switch arm thereby positively moving said latch on its support to closed position as the lever arm comes to rest.

6. In a locking mechanism for switch levers, the combination with a guide member, of a latch carrying member movable toward and away from said guide member within fixed limits so formed and mounted as to be free from any special means for manually moving it, spring mechanism tending to hold said movable member in proper relation to said guide member to receive the switch arm, an automatic movable latch on said latch carrying member so formed and mounted as to be freely movable by the switch arm in descending, but resisting upward movement of said arm and transmitting the force thereof to its supporting member to move it and the latch away from the guide member and out of the path of the lever, and means independent of the movement of said movable member for locking said latch against movement on said movable member.

7. In a locking mechanism for switch levers the combination with means embodying a socket of normally fixed width to receive the switch lever arm, one side of the socket embodying a latch supporting member yieldingly movable away from the other side of the socket, of a latch on said latch supporting member so mounted thereon as to normally remain automatically in locking position while being freely movable on said member out of the path of the lever arm in its descent but immovable on said member under upward pressure of the lever arm so formed and mounted as to cause the force of upward pressure of the arm to move it and its supporting member away from the opposite side of the socket and out of the path of the lever and means independent of the movement of said movable member itself for locking said latch against movement in said supporting member.

8. In a locking mechanism for switch levers the combination with means embodying a socket of normally fixed width to receive the switch lever arm, one side of the socket embodying a latch supporting member yieldingly movable away from the other side of the socket, of a latch on said latch supporting member so mounted thereon as to normally remain automatically in locking position while being freely movable on said member out of the path of the lever arm in its descent but immovable on said member under upward pressure of the lever arm so formed and mounted as to cause the force of upward pressure of the arm to move it and its supporting member away from the opposite side of the socket and out of the path of the lever, and lever mechanism for moving said latch on its supporting member independently of the movements of said member.

9. In a locking mechanism for switch levers the combination with means embodying a socket of normally fixed width to receive the switch lever arm, one side of the socket embodying a latch supporting member yieldingly movable away from the other side of the socket, of a latch on said latch supporting member so mounted thereon as to normally remain automatically in locking position while being freely movable on said member out of the path of the lever arm in its descent but immovable on said member under upward pressure of the lever arm so formed and mounted as to cause the force of upward pressure of the arm to move it and its supporting member away from the opposite side of the socket and out of the path of the lever, and lever mechanism for moving said latch on its supporting member independently of the movements of said member, and means for causing said lever mechanism to positively move said latch to closed position when the lever arm reaches the bottom of the socket.

10. In a locking mechanism for switch levers the combination with a guide member, of a latch supporting member spaced therefrom to receive the lever arm, an automatic latch pivoted on said supporting member near its upper end and movable thereon to a limited extent and normally resting by the action of gravity at one limit of its movement in position to lock the lever arm against upward movement but moving freely to admit the lever arm, a foot lever having an upwardly extending arm or toe for engaging and moving said latch on its supporting member into and out of locking position and having an extension adapted to be so moved by said latch in opening that shortly before the latch is in fully open position said extension will have risen to a point in the path of the lever arm slightly above the lower limit of its movement whereby the contact of the lever arm therewith will positively move said latch toward locked position.

11. In a locking mechanism for switch levers the combination with a guide member of a latch supporting member spaced therefrom to receive the lever arm, an automatic latch on said supporting member movable thereon to a limited extent and normally resting by the action of gravity at one limit of its movement in position to lock the lever arm against upward movement but moving freely to admit the lever arm, separate means so connected to said latch that each will impart movement to the other in either direction and so that as the latch approaches the limit of its opening movement said means will occupy a position in the path of the lever arm just above its point of rest so that it will positively move said latch toward closed position when struck by the lever arm.

12. In a locking mechanism for switch levers of railroads the combination of a socket adapted to receive the switch lever arm, manually releasable retaining means for holding said lever arm in said socket while permitting the free entry of said lever arm, means for locking the mechanism against manual release of the lever arm and means for causing the release of said lever from said locked mechanism through such severe upward pressure of the lever arm as would be produced by the train running through the switch.

13. In a locking mechanism for switch levers the combination with a guide member of a latch supporting member spaced therefrom to receive the lever arm, an automatic latch on said supporting member movable thereon to a limited extent and normally resting by the action of gravity at one limit of its movement in position to lock the lever arm against upward movement but moving freely to admit the lever arm, a foot lever pivoted adjacent the lower end of said supporting member and provided with an upwardly extending projection operatively engaging said latch and a horizontal projecting portion extending across the space between the guide member and supporting member slightly above its bottom in the path of the lever arm.

14. In a locking mechanism for switch levers, the combination with a guide member, of a latch supporting member spaced therefrom to receive the lever arm, an automatic latch pivoted at its upper portion to the upper portion of said supporting member provided on its lower side with an upwardly extending socket, and normally resting by gravity in position to lock the lever arm against upward movement but freely movable to permit the downward entering movement of the lever arm, and a foot lever pivoted adjacent said supporting member having an upwardly extending toe entering said socket of said latch to operate the same in either direction and a projecting portion in the path of the lever arm and adapted to be struck and moved thereby just before it comes to rest thus positively turning said latch to locked position.

15. In a locking mechanism for switch levers the combination with a guide member of a latch supporting member spaced therefrom to receive the lever arm, an automatic latch on said supporting member movable thereon to a limited extent and normally resting by the action of gravity at one limit of its movement in position to lock the lever arm against upward movement but moving freely to admit the lever arm, a foot lever for moving said latch to open position freely movable therewith in either direction but having a part which moves upwardly into the path of said lever arm just above the lower limit of its movement as the latch approaches the limit of its opening movement.

In testimony whereof I affix my signature.

NEIL E. SALSICH.